March 14, 1961 R. H. STADLER 2,974,437
BAIT TANK
Filed Feb. 10, 1958
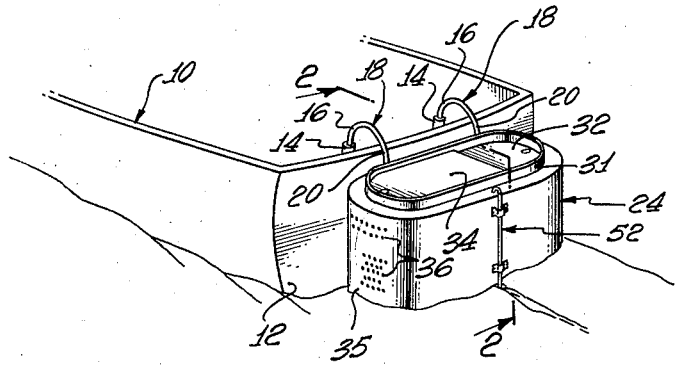
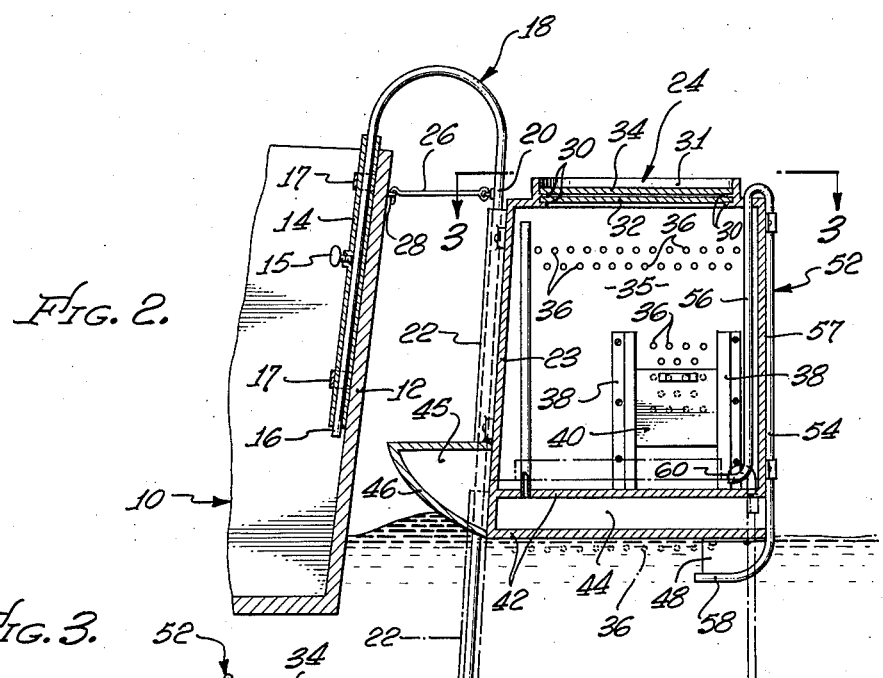
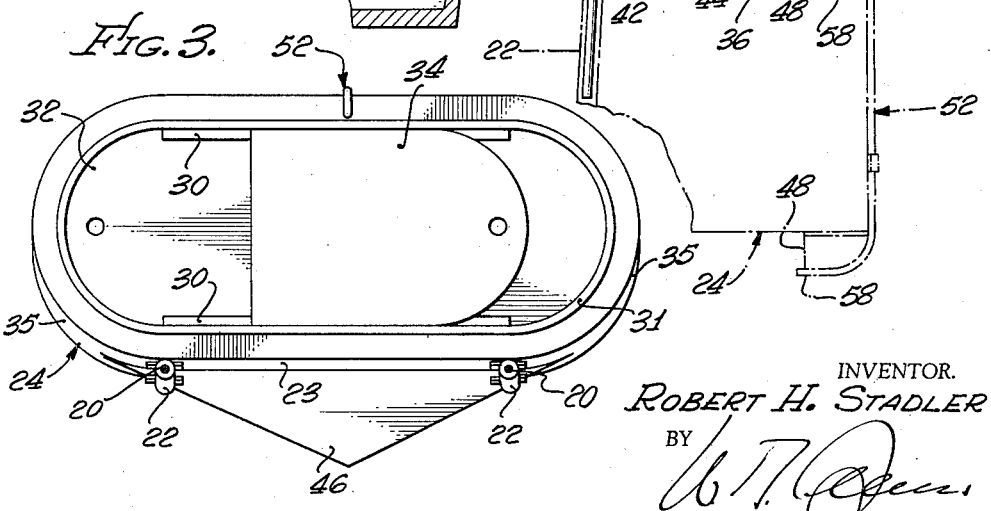
INVENTOR.
ROBERT H. STADLER
BY
ATTORNEY.

United States Patent Office 2,974,437
Patented Mar. 14, 1961

2,974,437
BAIT TANK
Robert H. Stadler, 2531 Foothill Blvd., La Crescenta, Calif.
Filed Feb. 10, 1958, Ser. No. 714,337
7 Claims. (Cl. 43—55)

This invention relates to bait tanks and more particularly to an improved bait tank adapted to be buoyantly supported rearwardly of a fishing boat and is so designed as to offer a minimum drag on the boat while the boat is under way.

Fishermen, both commercial and sport, have the problem of providing life sustaining conditions for live bait. This problem is emphasized when fishing is done from small water vessels having inadequate onboard space such as boats, catamarans, and the like. Efforts have been made to suspend the bait, in containers, over the sides of the vessel. However, when this is done, the bait tanks seriously impede the speed of the boat and greatly increase the fuel consumption.

Therefore, an object of this invention is to provide an improved bait tank adapted to be releasably attached to the rear of a boat and which is easily accessible and yet does not materially interfere with the operation or speed of the boat or adversely affect its operating characteristics.

Another object of the invention is the provision of a bait tank for small boats and the like adapted to hydroplane automatically in response to the propulsion of the boat and to settle down into the water as the boat slows down.

A further object of the invention is the provision of a bait tank for small boats and the like having a chamber or compartment that fills with water as the boat slows down thereby allowing the tank partially to submerge.

Another object of this invention is to provide a bait tank for small boats and the like that has a pitot tube type pump functioning to circulate fresh water through the tank so long as the boat is under way.

A still further object of the invention is to provide a bait tank for small boats and the like that is generally oval in shape and has a series of openings or perforations in at least one wall through which water may circulate at all times to maintain a continuous supply of aerated water for the live bait.

A still further object of the invention is to provide a bait tank having simple yet rugged means for movably coupling a buoyant live bait tank outboard from the transom of fishing craft and so constructed and arranged that the tank can be quickly attached to and detached from the transom.

Briefly, the invention comprises a live bait tank that may be releasably attached to the transom of a small boat. The bait tank has a false bottom in combination with a hydroplaning means cooperating when the boat is propelled forwardly to elevate the tank substantially free of the water and so as to skim the water surface producing a minimum drag on the boat. Structure is provided that will circulate water into the tank for overflow through level control openings in its upper side wall, an adjustable gate being provided to control the rate and level of the overflow. Additionally, there is a ventral fin on said tank that, combined with the hydroplane surface, acts to stabilize the movement of the bait tank, particularly during high speed travel of the boat.

These and other more specific objects will appear upon reading the following specification and claims and upon considering in connection therewith the attached drawing to which they relate.

In the drawing:

Figure 1 is a fragmentary perspective view illustrating the present invention and the method of attachment to the transom of a small boat under way and with the bait tank in hydroplaning position;

Figure 2 is an enlarged, cross-sectional view taken along line 2—2 of Figure 1 looking in the direction indicated;

Figure 3 is a top plan of the bait tank taken on line 3—3 of Figure 2 loking in the direction of the arrows.

Referring to the drawings for a more detailed description of the invention, there is shown a boat 10 having a transom or stern panel 12. Suitably clamped to the inboard side of the transom, as by clips 17, 17 are a pair of elongated tubes 14, each of which has intermediate the ends thereof thumb screws or fasteners 15, it being understood that the tubes 14 preferably project above the top edge of transom 12 as illustrated in Figure 1.

One leg 16 of a pair of U-shaped brackets designated generally 18 is adapted to be telescopically seated in tubes 14, 14, and clamped in place by thumb screws 15. The other leg 20 of each bracket fits loosely within a tubular socket 22 fastened to wall 23 of an oval live bait tank or container 24. Pivotally connected to leg 20 of each bracket 18 is a hook 26 having its hooked end normally seated in an eye 28 screwed into the outboard side of transom 12. It will be understood that this hook acts to lock brackets 18 against pivotal movement about the axes of legs 16 and keep legs 20 spaced rearwardly of the transom.

Bait tank 24 has an upwardly projecting flange 31 at its upper rim defining an oval opening appreciably smaller than the main body of the tank. The flange in turn has three spaced inwardly projecting flanges 30 cooperating to provide guideways and retainers for a pair of sliding doors 32, 34 by which the access opening to the tank can be closed.

Each end 35 of tank 24 has a series of overflow and water level control openings 36 therein arranged generally opposite a desired water level as well as the normal water line when the boat is at standstill. On the interior side of each end of the tank is a pair of spaced brackets 38 slidably supporting a gate 40 which may be moved up or down as desired to open or close certain of the perforations and thereby control the circulation of water between the tank and the surrounding water.

A particularly important feature of the bait tank is the provision of a double walled bottom 42 defining a water ballast compartment 44 open to the water along its rear end. In consequence, it will be recognized that when the boat is at a standstill, compartment 44 fills with water and the tank settles in the water, lacking buoyancy, until the upper rows of perforations 36 are slightly submerged. It is pointed out that a sealed flotation chamber 45 formed by hull-shaped pontoon 46 secured along the lower forward corner of the tank provides buoyancy useful in controlling the free flotation level of the tank. A second and highly important function of pontoon 46 is to cause the tank to rise automatically as the boat gains speed until, at higher boat speeds, the tank hydroplanes or skims the churning water rearwardly of the transom. At the same time, the ballast water is sucked from chamber 44 thereby adding materially to the buoyancy of the tank and supplementing the hydroplaning action in elevating the tak upwardly along legs 20 of brackets 18.

Secured centrally to the lower rear edge of bottom 42 is a stabilizer fin 48 lying in a generally vertical plane and serving additionally to support the forwardly curved end of a pitot tube type water pump 52. Pump 52 is of inverted U-shape and one of its vertical legs 54 is rigidly secured to the wall of the tank with its lower end 60 discharging into the bottom of the tank. The outer end 58 opens forwardly so that the forward movement of the boat causes water to be forcibly elevated into the tank. In this manner it will be understood that the water within the tank is maintained fresh and at a level far above the surrounding water so long as the boat is under way and even though such travel is maintained for hours at a time.

Attention is directed to the fact that the space provided between U-shaped brackets 18 and between transom 12 and hydroplane surface 46 will accommodate an outboard motor. Further, an outboard motor may be located on the outboard side of each bracket 18 in the event a pair of motors are desired. Owing to the locking and antisway action of hooks 26, the tank cannot swing forwardly against the motors or the boat as would otherwise occur during maneuvering of the boat, sudden stops and the action of the other boats.

The operation of the invention is as follows:

Legs 16 of each U-shaped bracket is inserted into each tube 14 and thumb screws 16 are tightened thereagainst. Each hook 26 is inserted in an associated one of eyes 28 and outer legs 20 of the brackets are telescoped into tubes 22 on the side wall of the bait tank. So long as the boat is not moving water ballast compartment 44 will be full of water and it will be understood that the tank is submerged to its lower operating level with the water level opposite water level control perforations 36. It is pointed out that the degree of buoyancy is a matter of design, the materials used and the size of the closed pontoon compartment 45 within the hydroplaning means 44. The gate 40 may be set to expose any number of selected perforations 36.

When the boat is in motion, water enters the forwardly facing end 58 of water circulating pump 52 and is delivered into the tank to maintain the water level as well as to supply fresh water to the tank. Excess water pumped into the container overflows through those perforations 36 not covered by regulating gate 40. Additionally, as the boat is propelled through the water, the impingement of water on hydroplane surface 46 elevates the bait tank 24 to a level dependent on the speed of the boat. At higher speeds, the hydroplane will cause the tank virtually to skim the water surface with a minimum resultant drag effect on the boat. The hook 26 and eye 28 prevent bending of bracket 18 and ventral fin 48 attached to double bottom 42 stabilizes the tank and prevents yawing which would otherwise result from the surging wake water. When the boat reduces speed or stops, water enters compartment 44 and the live bait tank re-submerges automatically to the extent permitted by the buoyance capabilities of the closed air chamber 45.

Access to live bait in container 24 is through the sliding closures 32 and 34.

Although the bait tank has been described as freely slidably along legs 20 of the tubular brackets 18 and along the interior of the tubular sockets 22, it will be understood that pairs of rollers having concave rims may be secured to forward wall 23 of the bait tank and suitably spaced to support legs 20 between the facing rims of each pair, there being two or more pairs of such rollers spaced vertically of the tank for each of the bracket legs 20. The described alternative construction facilitates the rise and fall of the tank and provides even greater assurance of trouble-free operation.

While the particular bait tank herein shown and disclosed in detail is fully capable of attaining the objects and providing advantages hereinbefore stated, it is to be understood that it is merely illustrative of the presently preferred embodiments of the invention and that no limitations are intended to the details of construction or design herein shown other than as defined in the appended claims.

I claim:

1. A bait tank comprising a container having water level control perforations in the walls thereof, means for releasably attaching said container to the exterior of a boat and including means guiding said container to slide up and down thereon as the elevation of said bait tank changes relative to water surface exteriorly of said tank, hydroplane surface means on said container effective to elevate said bait tank to reduce the drag on the boat when said boat is propelled forwardly, and means to circulate water into the tank for overflow through said perforations when the tank is hydroplaning and supported in an elevated position with its water level substantially above the surrounding water level.

2. A bait tank comprising a container having perforations in the walls thereof, means for releasably attaching said container to the exterior of a boat with the container free to slide up and down on said attaching means at all times and particularly during changes in speed of a boat to which said tank is attached, hydroplane means on said container operable to elevate said container when said boat is in motion, a water ballast compartment arranged to fill with water to submerge the container to a greater extent when the boat is traveling slowly, and means for emptying said chamber when the boat is traveling at higher speeds to aid in elevating the container and thereby decreasing the drag on the boat to which said container is attached.

3. A bait tank comprising a container having perforations in the walls thereof, said container having a main bait compartment and an independent ballast compartment, means for releasably attaching said container to the exterior of a boat while leaving the container free to slide up and down on said attaching means and relative to the boat to which the same is attached; hydroplane means on said container operable to elevate said container when the boat is in motion; a water ballast compartment in said container adapted to fill with water partially to aid in submerging the container when the boat is standing, means for automatically purging the water therefrom to increase the buoyancy of the container when the boat is under way, and means responsive to the travel of the boat through the water to pump water into said elevated hydroplaning container.

4. A bait tank adapted to be partially submerged at the side of a boat, said tank comprising a perforated bait container, a pair of U-shaped brackets one leg of each of which is connected with a side wall of said container and the other leg of which is adapted to be connected with a boat, one of the legs of each bracket being slidable axially thereof, means carried by said container for elevating said container with respect to the surrounding water in response to changes in the speed at which said container is propelled through the water, and water circulating means for scooping water into the interior of said container including a ventral fin adapted to stabilize the container and to reduce the yaw thereof as the container is being propelled through the water by a boat.

5. A bait tank comprising a pair of spaced U-shaped brackets one leg of each of which is releasably attached to a boat, a container slidably attached to a second leg of each of said brackets, means on the bottom of said container and in the water effective ot cause said container to rise out of the water when the boat is moving, an element on said container adapted to scoop up and direct water to the interior of said container thereof, and a ventral fin on said container to reduce yaw as it is propelled through the water by said boat, said container having openings therein through which water may pass which openings are above the water line with the container moving through the water and below said line with said container standing.

6. The construction recited in claim 5 characterized in that valve means are provided to control the flow of water through certain of said openings.

7. A bait tank comprising a container, means on the container for releasably attaching the same to a boat, said container being mounted for sliding movement up and down on said means, an element on said container and in contact with the water and adapted to receive force therefrom upon the movement of the boat and of said container forwardly through the water to move said container upwardly, a pitot tube carried by said container partially submerged in the water adapted to direct water to the interior of said container upon the movement of said boat, said container having perforations in at least one of its sides.

References Cited in the file of this patent
UNITED STATES PATENTS

| | | |
|---|---|---|
| 1,788,255 | Thomas | Jan. 6, 1931 |
| 2,657,496 | Spotswood | Nov. 3, 1953 |
| 2,721,718 | Wagner | Oct. 25, 1955 |
| 2,855,720 | Allen | Oct. 14, 1958 |

FOREIGN PATENTS

| | | |
|---|---|---|
| 2,525 | Great Britain | 1894 |